(12) United States Patent
Gould et al.

(10) Patent No.: US 12,152,882 B2
(45) Date of Patent: Nov. 26, 2024

(54) LASER LEVEL SYSTEMS AND CONTROLS

(71) Applicant: Milwaukee Electric Tool Corporation, Brookfield, WI (US)

(72) Inventors: Samuel A. Gould, West Allis, WI (US); Jacob D. Hadfield, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 429 days.

(21) Appl. No.: 17/538,669

(22) Filed: Nov. 30, 2021

(65) Prior Publication Data
US 2022/0170744 A1 Jun. 2, 2022

Related U.S. Application Data

(60) Provisional application No. 63/119,958, filed on Dec. 1, 2020.

(51) Int. Cl.
*G01C 15/00* (2006.01)

(52) U.S. Cl.
CPC ................... *G01C 15/006* (2013.01)

(58) Field of Classification Search
CPC .... G01C 15/00; G01C 15/002; G01C 15/004; G01C 15/006; G01C 15/008; G01C 15/02
USPC .................................................. 33/290, 291
See application file for complete search history.

(56) References Cited

U.S. PATENT DOCUMENTS

| | | | |
|---|---|---|---|
| 4,676,634 A * | 6/1987 | Petersen | G01C 15/006 356/141.3 |
| 4,820,041 A | 4/1989 | Davidson et al. | |
| 5,784,155 A | 7/1998 | Ohtomo et al. | |
| 5,894,123 A | 4/1999 | Ohtomo et al. | |
| 5,898,490 A * | 4/1999 | Ohtomo | G01C 15/004 356/141.3 |
| 6,011,613 A | 1/2000 | Ohtomo et al. | |
| 6,075,586 A | 6/2000 | Ohtomo et al. | |
| 6,249,338 B1 | 6/2001 | Ohtomo et al. | |
| 6,396,571 B2 * | 5/2002 | Ohtomo | G01S 7/497 356/5.1 |
| 6,397,484 B1 | 6/2002 | Greene | |
| 6,452,668 B1 | 9/2002 | Pratt | |
| 6,519,029 B1 | 2/2003 | Hedges et al. | |
| 6,618,133 B2 | 9/2003 | Hedges et al. | |
| 6,621,565 B2 | 9/2003 | Pratt et al. | |
| 6,630,993 B1 | 10/2003 | Hedges et al. | |
| 6,662,103 B1 | 12/2003 | Skolnick et al. | |
| 6,693,706 B2 | 2/2004 | Kahle et al. | |
| 6,964,106 B2 | 11/2005 | Sergyeyenko et al. | |

(Continued)

FOREIGN PATENT DOCUMENTS

| | | |
|---|---|---|
| CN | 205228466 | 5/2016 |
| CN | 205691122 | 11/2016 |

(Continued)

*Primary Examiner* — George B Bennett
(74) *Attorney, Agent, or Firm* — Reinhart Boerner Van Deuren s.c.

(57) ABSTRACT

Various laser level designs and targets are shown. In one example, a laser level emits one or more lasers that can be self-leveled via an internal leveling mechanism. The one or more lasers can be rotated and adjusted in response to commands received from a user. One or more laser levels described project target lights at predetermined distances on a surface, such as a ceiling.

4 Claims, 15 Drawing Sheets

(56) References Cited

U.S. PATENT DOCUMENTS

| | | | |
|---|---|---|---|
| 7,323,673 B1 * | 1/2008 | Ake | G01J 1/4257 |
| | | | 250/214 R |
| 7,367,129 B2 | 5/2008 | Lu | |
| 7,373,725 B1 * | 5/2008 | Vanneman | G01C 15/002 |
| | | | 33/294 |
| 7,454,839 B2 | 11/2008 | Della Bona et al. | |
| 7,760,369 B2 | 7/2010 | Sehr | |
| 8,087,176 B1 | 1/2012 | Hayes et al. | |
| 8,098,367 B2 | 1/2012 | Kirk et al. | |
| 8,281,495 B2 | 10/2012 | Hayes et al. | |
| 8,595,946 B2 | 12/2013 | Hayes et al. | |
| 8,605,274 B2 | 12/2013 | Schumacher | |
| 8,619,250 B2 | 12/2013 | Hayashi et al. | |
| 8,711,369 B2 | 4/2014 | Campagna | |
| 8,720,074 B2 | 5/2014 | Amor | |
| 8,745,884 B2 | 6/2014 | Hayes | |
| 8,857,068 B2 | 10/2014 | Kodaira | |
| 8,869,411 B2 | 10/2014 | Lukic et al. | |
| 8,943,701 B2 | 2/2015 | Hayes et al. | |
| 9,200,900 B2 | 12/2015 | Fessler et al. | |
| 9,441,967 B2 | 9/2016 | Ranieri et al. | |
| 9,880,022 B1 | 1/2018 | Unger | |
| 10,145,676 B2 | 12/2018 | Hayes et al. | |
| 10,564,033 B2 | 2/2020 | Lukic et al. | |
| 10,684,129 B2 | 6/2020 | Lukic et al. | |
| 10,697,796 B2 | 6/2020 | Lukic et al. | |
| 10,712,828 B2 * | 7/2020 | Yamaguchi | G06F 3/0346 |
| 10,823,565 B2 | 11/2020 | Winter et al. | |
| 10,895,472 B2 | 1/2021 | Lukic | |
| 10,935,369 B2 | 3/2021 | Hayes et al. | |
| 2005/0278966 A1 | 12/2005 | Liu | |
| 2018/0217748 A1 * | 8/2018 | Cao | G06F 3/04883 |
| 2020/0240783 A1 | 7/2020 | Eidinger et al. | |
| 2020/0249016 A1 | 8/2020 | Shi et al. | |
| 2023/0204357 A1 * | 6/2023 | Shimizu | G06F 3/0484 |
| | | | 715/771 |

FOREIGN PATENT DOCUMENTS

| | | |
|---|---|---|
| CN | 206618423 | 11/2017 |
| CN | 209197757 | 8/2019 |
| DE | 29901118 | 5/1999 |
| DE | 29906312 | 9/1999 |
| DE | 202013009045 | 1/2014 |
| DE | 102019103399 | 8/2019 |
| EP | 1038158 | 12/2005 |
| EP | 1203930 | 2/2007 |
| WO | WO20141069 | 7/2020 |

* cited by examiner

LASER LEVEL SYSTEMS AND CONTROLS

CROSS-REFERENCE TO RELATED PATENT APPLICATION

The present application claims the benefit of and priority to U.S. Provisional Application No. 63/119,958, filed on Dec. 1, 2020, which is incorporated herein by reference in its entirety.

BACKGROUND OF THE INVENTION

The present invention relates generally to the field of tools. The present invention relates specifically to laser projection systems and controls, such as laser levels and laser level targets.

SUMMARY OF THE INVENTION

One embodiment of the invention relates to a laser level including a housing, a first laser light generator, and an input device. The first laser light generator is disposed within the housing and is operable to generate a first line of light. The input device includes an input button and a capacitance sensor. The capacitance sensor is configured to detect whether a hand of a user is within a first non-zero distance of the input button. The input device is configured to generate a signal controlling the first laser light generator in response to detecting the hand is within the first non-zero distance of the button.

In various embodiments, the laser level is a point, line and place laser level. In various embodiments, the input button is configured to toggle whether the first laser light generator is generating the first line of light. In various embodiments, the step of detecting the hand is within the first non-zero distance of the button includes the capacitance sensor detecting a change in capacitance.

Another embodiment of the invention relates to a laser beam generating device including a housing, a first laser emitter operable to generate a first beam (e.g., line) of light, and a second laser emitter operable to generate a second beam (e.g., line) of light. A first orientation adjusting device is configured to adjust the first line of light and the second line of light around a first axis, a second orientation adjusting device is configured to adjust the first line of light and the second line of light around a second axis perpendicular to the first axis, and a third orientation adjusting device is configured to adjust the first line of light and the second line of light around a third axis perpendicular to the first axis and the second axis.

In a specific embodiment, the first line of light is emitted along a first plane and the second line of light is emitted along a second plane perpendicular to the first plane.

Another embodiment of the invention relates to a method of controlling a laser beam generating device. The method includes emitting a beam of light from a laser beam generating device. The laser beam generating device includes a laser light generator operable to emit the beam of light, the beam of light including a first line of light and a second line of light perpendicular to the first line of light. The laser beam generating device includes a first orientation adjusting device configured to adjust an orientation of the first line of light and the second line of light around a first axis. The laser beam generating device includes a second orientation adjusting device configured to adjust an orientation of the first line of light and the second line of light around a second axis perpendicular to the first axis. The laser beam generating device includes a third orientation adjusting device configured to adjust an orientation of the first line of light and the second line of light around a third axis perpendicular to the first axis and the second axis. The method also includes measuring an orientation of the housing based on measuring light emitted through a spirit vial, and adjusting at least one of the first orientation adjusting device, the second orientation adjusting device and/or the third orientation adjusting device as a result of measuring the orientation of the housing.

In a specific embodiment, the method includes receiving a signal to reposition the housing relative to a base, the housing being slidably and rotatably coupled to the base. In a specific embodiment, the housing slidingly actuates between a first position relative to the base and a second position relative to the base. An upper surface of the housing in the first position is perpendicular to the upper surface of the housing when the housing is in the second position.

Another embodiment of the invention relates to a laser light reflecting device including a housing, a flat outer surface of the housing, and a mirror internal to the housing configured such that when the flat outer surface is placed on a surface of an object, light received by the mirror is redirected to help adjust the corresponding laser emitting device.

Another embodiment of the invention relates to a laser light reflecting device including a housing, a reflective surface coupled to the housing, a self-leveling device coupled to the housing and configured to adjust the reflective surface toward a predetermined angle (e.g., 45 degrees) relative to a horizontal plane. A horizontal beam of light received by the reflective surface is reflected vertically upward into a vertical beam of light.

In a specific embodiment, the housing includes an aperture in an upper wall through which the vertical beam of light is reflected.

Another embodiment of the invention relates to a method of controlling a laser beam generating device. The method includes measuring a distance between a reference location and a moveable laser beam generating device, the moveable laser beam generating device being configured to detect a path along which to move (e.g., via photo diodes). The method includes receiving a target distance at the moveable laser beam generating device and comparing the measured distance to the target distance. The method includes emitting a laser from the moveable laser beam generating device as a result of the measured distance being less than a threshold distance from the first target distance.

In a specific embodiment the reference finding laser is emitted vertically upward to the reference location.

Another embodiment of the invention relates to a laser light system including a laser beam generating device and a laser target. The laser beam generating device includes a housing and a distance measuring device configured to measure a distance and emit a signal indicating the measured distance. The target includes a receiver to receive the signal indicating the measured distance, a controller configured to generate filtered data based at least in part on the measured distance, and a display device configured to display a signal indicating the filtered data.

Another embodiment of the invention relates to a method of controlling a laser beam generating device. The method includes receiving, at a moveable laser beam generating device configured to emit a beam of light, a signal indicating a location of a first target on a surface. The method includes measuring a distance between the moveable laser beam generating device and the surface, and receiving a signal indicating a target distance between a second target on the surface and the first target on the surface. The method includes calculating an angle to emit a beam of directed at the second target based at least in part on the measured distanced and the distance between the second target and the first target. The method includes emitting a beam of light at the second target on the surface based at least in part on calculating the angle.

In a specific embodiment, the method includes measuring a confirmatory distance to a location where the beam of light is being emitted, comparing the confirmatory distance to the target distance and measured distance, and as a result of comparing the confirmatory distance, generating a signal indicating the beam of light should be adjusted.

Another embodiment of the invention relates to a laser beam generating device including a housing, a first laser light generator disposed within the housing operable to generate a first line of light, and an input device comprising a input button and a capacitance sensor. The capacitance sensor is configured to determine whether a user (e.g., a hand of the user) is within a first distance of the input button.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
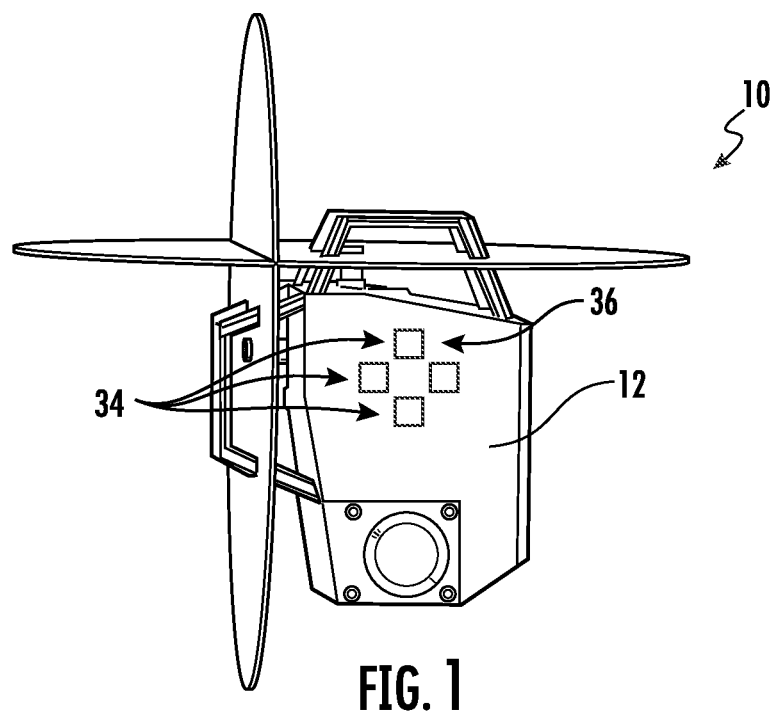
FIG. 1 is a perspective view of a laser level, according to an exemplary embodiment.
Figure 2:
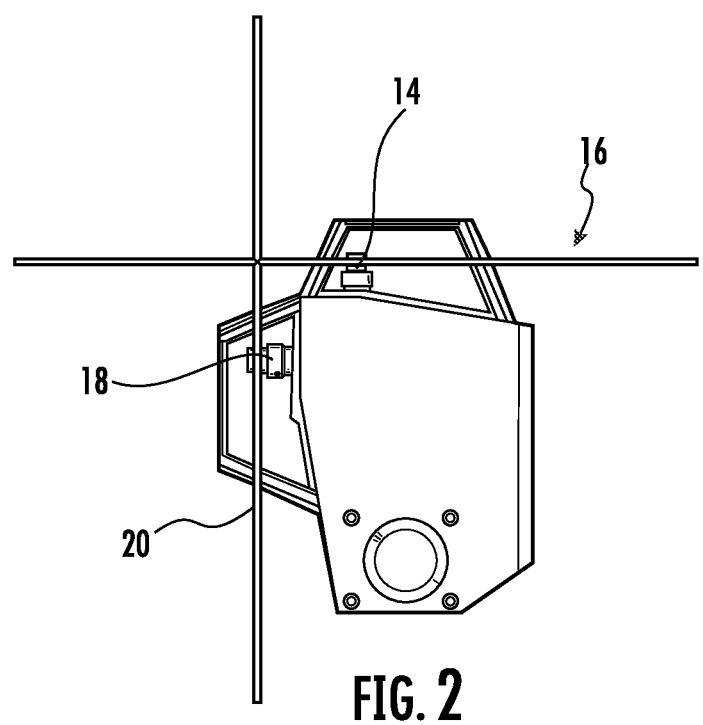
FIG. 2 is a side view of the laser level of FIG. 1, according to an exemplary embodiment.
Figure 3:
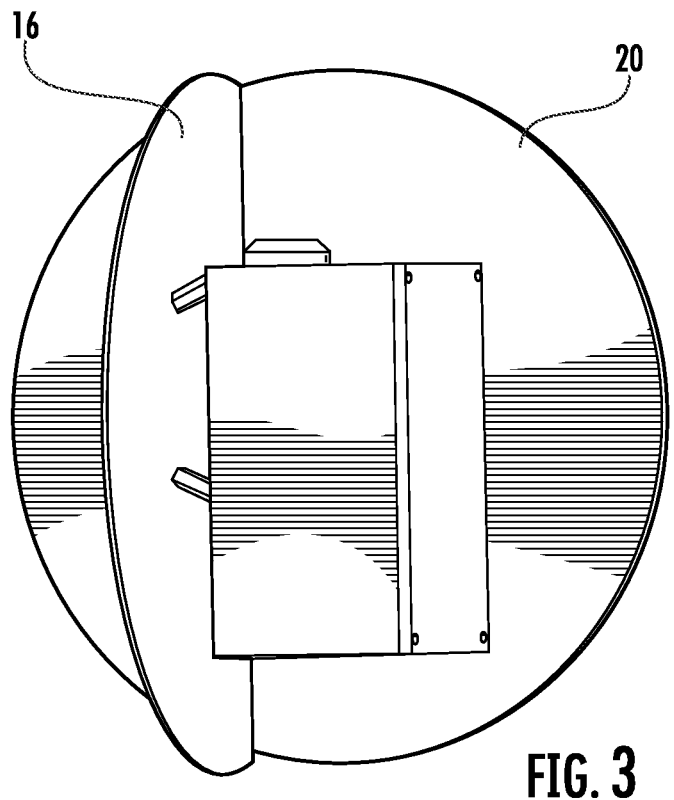
FIG. 3 is a perspective view of the laser level of FIG. 1, according to an exemplary embodiment.
Figure 4:
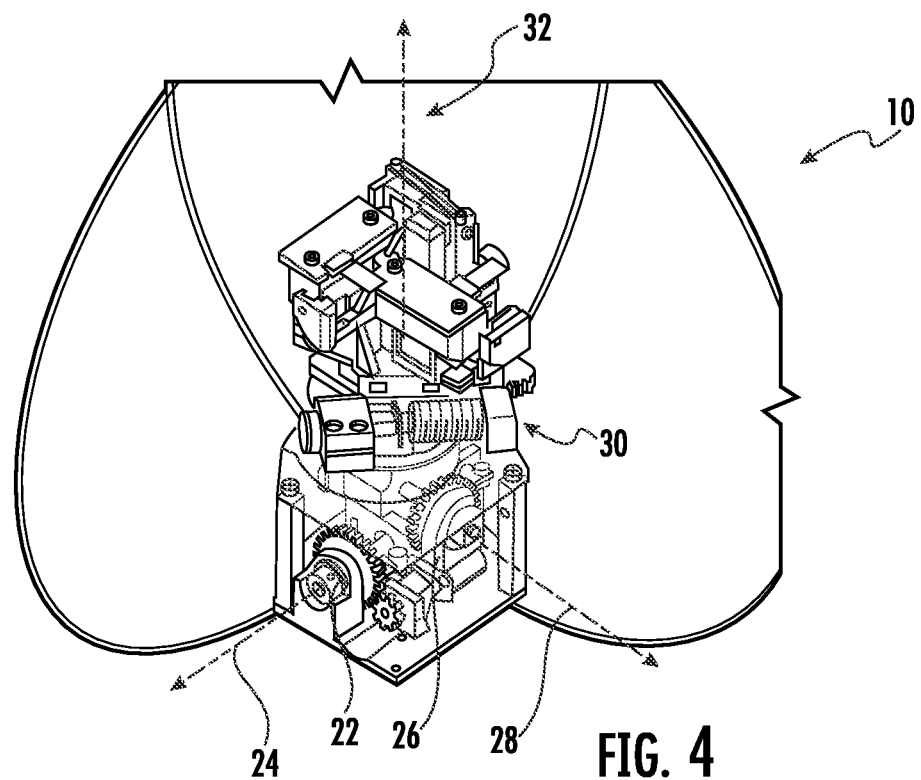
FIG. 4 is a perspective view of the laser level of FIG. 1, according to an exemplary embodiment.
Figure 5:
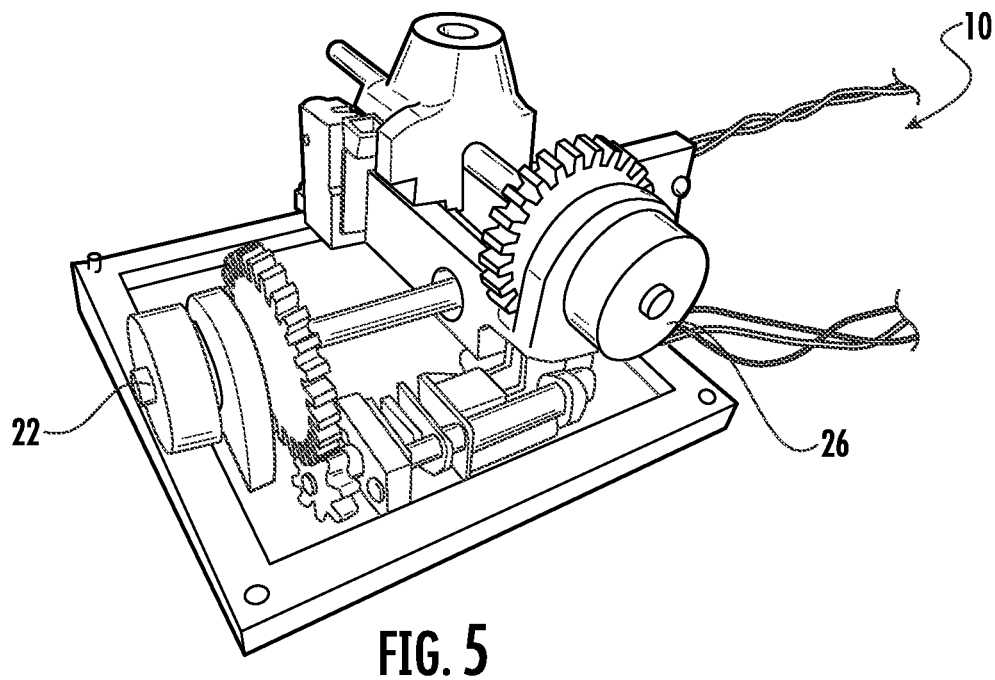
FIG. 5 is a perspective view of a portion of the laser level of FIG. 1, according to an exemplary embodiment.
Figure 6:
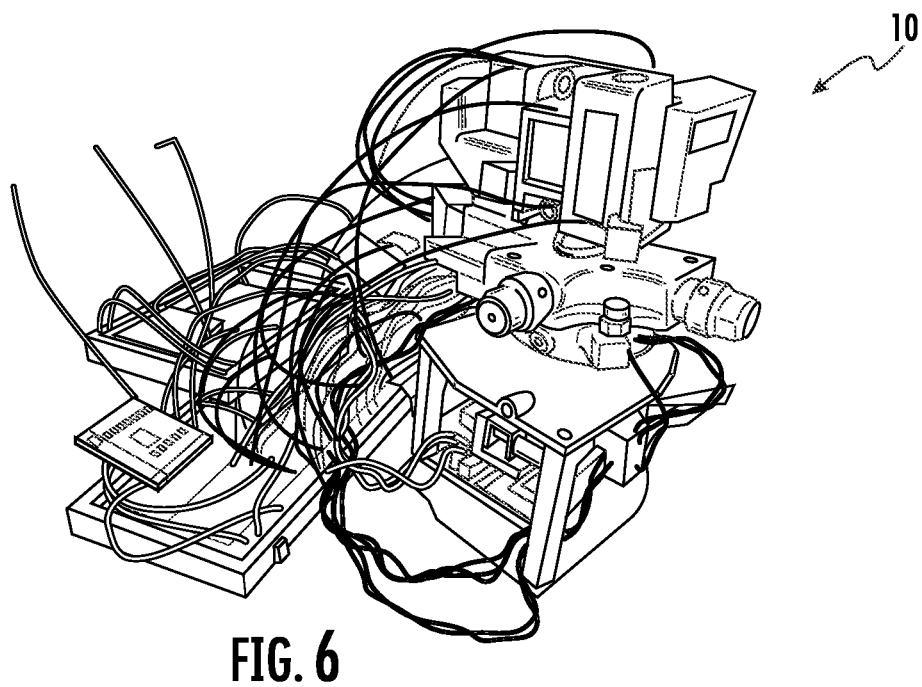
FIG. 6 is a perspective view of a portion of the laser level of FIG. 1, according to an exemplary embodiment.
Figure 7:
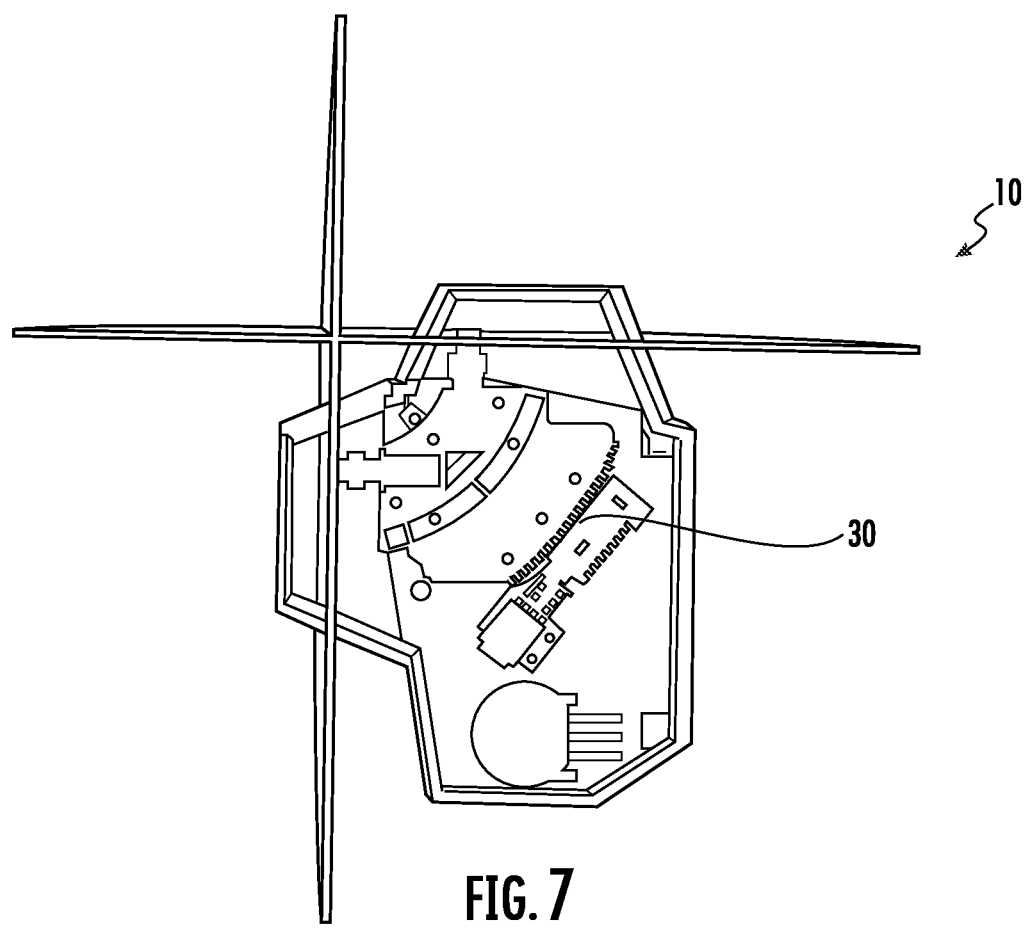
FIG. 7 is a cross-section view of the laser level of FIG. 1, according to an exemplary embodiment.
Figure 8:
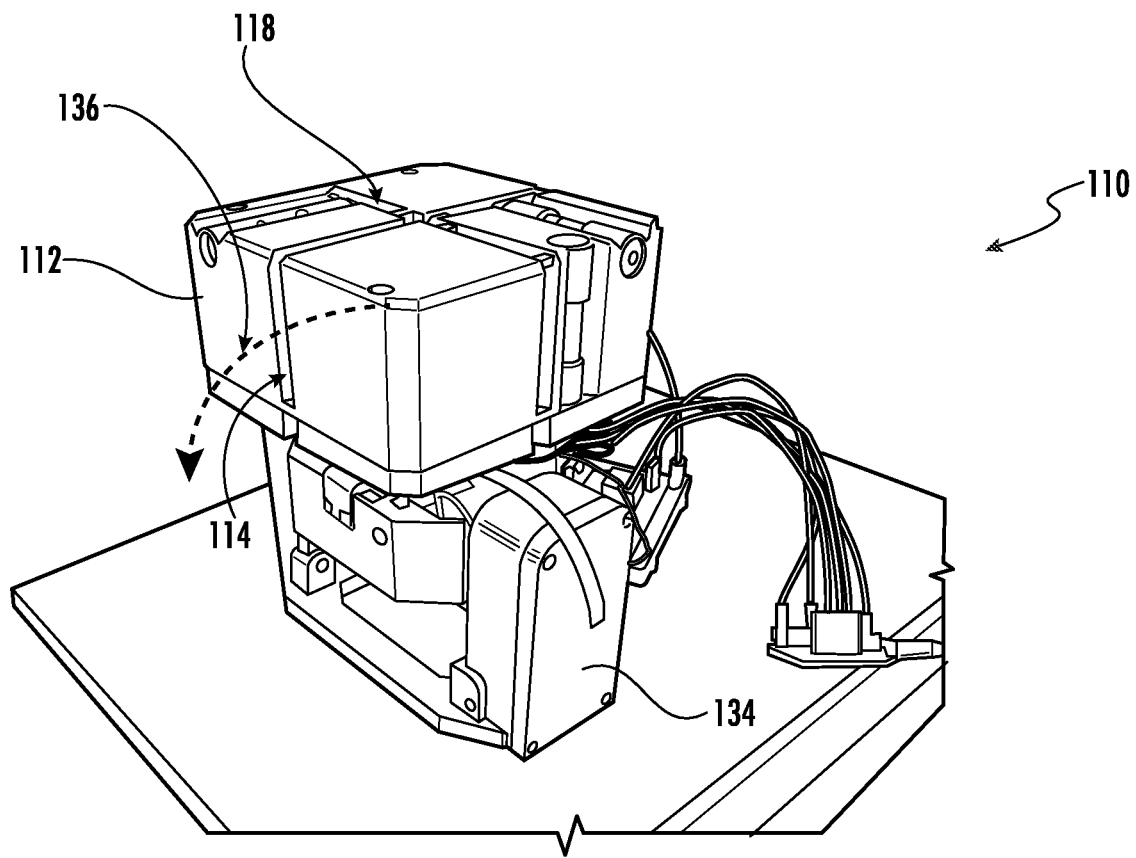
FIG. 8 is a perspective view of a laser level, according to an exemplary embodiment.
Figure 9:
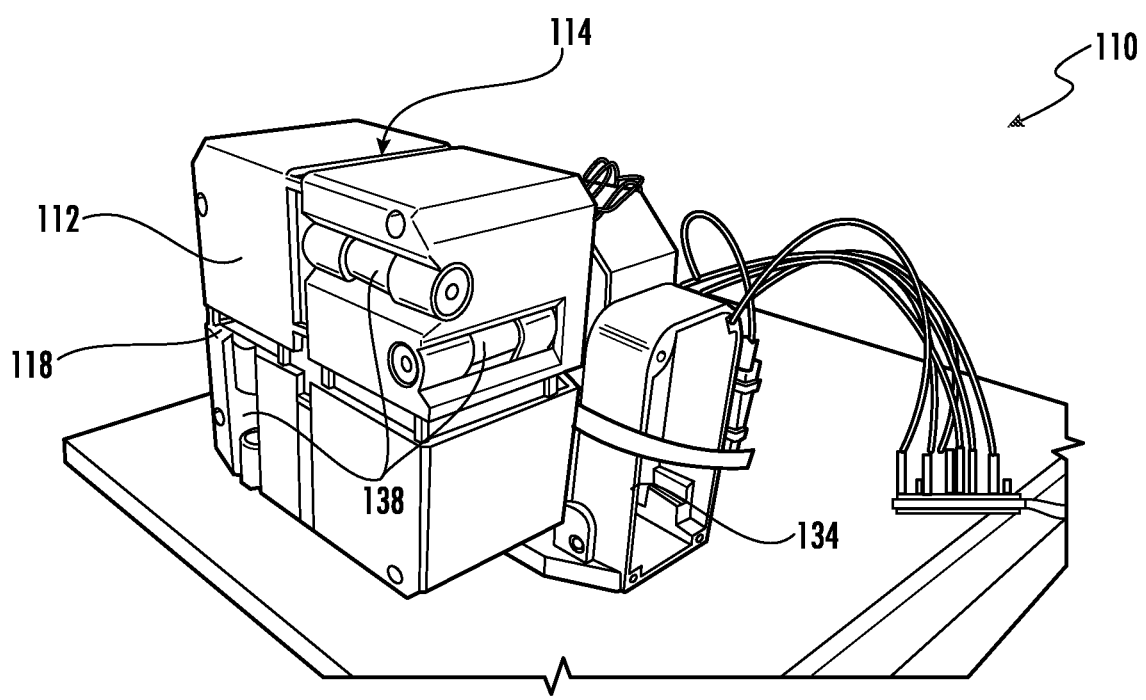
FIG. 9 is a perspective view of the laser level of FIG. 8, according to an exemplary embodiment.

Referring generally to the figures, various embodiments of a laser emitter and reflection devices and systems, such as concepts related to using point, line and place (PLP) laser levels. As will generally be understood, laser level systems, including laser emitters and laser targets, are used to align objects or features in an area (e.g., such as holes along a wall, pipe, conduit, etc.).

In various embodiments, the laser level systems described herein are configured to be precisely adjusted along three distinct axes. In one embodiment, the laser level system includes a housing that emits one or more laser level beams of light. The housing is slideably and pivotally adjusted to a base. As the housing slides with respect to the base, the beams of light are emitted at varying angles with respect to the base.

In another embodiment, a laser level target redirects light received from a laser level. Based on the reflected light, the user can adjust the laser emitter and/or the target to the desired configuration.

In another embodiment, a laser emitter is provided the ability to move along a desired path (e.g., a path marked by tape and/or a laser line). The laser emitter receives instructions to emit a laser light vertically at various points along the path.

In another embodiment, a laser level measures a distance to a surface, such as a ceiling. The laser level receives instructions to project light at various points along the surface. The laser level calculates the angles to project light at the various points.

Referring to FIGS. 1-7, a laser emitter and/or laser beam generating device, shown as laser level 10, is shown. Laser level 10 includes housing 12, a first light generator, shown as laser emitter 14, and a second light generator, shown as laser emitter 18. Laser emitter 14 emits a light, shown as laser 16, along a first plane, and laser emitter 18 emits a light, shown as laser 20, along a second plane. In a specific embodiment, plane of laser 16 is perpendicular to plane of laser 20.

Laser level 10 includes a first orientation adjusting device 22 that rotates laser emitters 14, 18 around first axis 24, and second orientation adjusting device 26 that rotates laser emitters 14, 18 around second axis 28. In a specific embodiment, first orientation adjusting device 22 and second orientation adjusting device 26 each include a hex-keyed ball joint and a gimbal.

Laser level 10 includes a third orientation adjusting device 30 that rotates laser emitters 14, 18 around third axis 32. In a specific embodiment, third orientation adjusting device 30 includes three cylindrical slots that ride on bearings on a stationary plate attached to the gimbal coupled to first orientation adjusting device 22 and second orientation adjusting device 26.

When laser level 10 is placed in a first orientation (FIG. 2), plane of laser 16 is emitted parallel to the surface that laser level 10 is resting on (e.g., perpendicular to gravity), and plane of laser 20 is emitted vertically (e.g., parallel to gravity). In a specific embodiment, laser level 10 can be controlled so that the horizontally-emitted laser, laser 16 in FIG. 2, can be rotated clockwise or counter-clockwise (from the perspective shown in FIG. 2) to project an angled line with respect to a horizontal plane.

When laser level 10 is placed in a second orientation (FIG. 3), planes of both laser 16 and laser 20 are emitted vertically (e.g., parallel to gravity). In a specific embodiment, when lasers 16, 20 are emitted vertically, a remote control is configured to control laser level 10 (e.g., via radio frequency communications) such that the planes of lasers 16, 20 rotate with respect to the intersection between planes of lasers 16, 20.

In various embodiments, laser level 10 is configured to be placed on the ground in a first orientation such that both planes of light are vertical, in a second orientation on a first side such that plane of laser 16 is vertical and plane of laser 20 is horizontal, and in a third orientation on a second side such that plane of laser 16 is horizontal and plane of laser 20 is vertical.

Referring to FIGS. 8-11, a laser emitter and/or laser beam generating device, shown as laser level 110, is shown. Laser level 110 is substantially the same as laser level 10 except for the differences discussed herein.

Laser level 110 includes housing 112, laser emitter 114 coupled to housing 112, and laser emitter 118 coupled to housing 112. In the configuration shown in FIG. 8, laser emitter 114 and laser emitter 118 emit lasers vertically (e.g., parallel to gravity).

In a specific embodiment, laser level 110 includes leveling devices, shown as spirit vials 138. Laser level 110 emits light through one or more of spirit vials 138 to determine an orientation of housing 112. As a result of these measurement(s), laser level 110 adjusts the orientation of housing 112 so that the lasers are emitted at the desired orientation (e.g., vertically and/or horizontally).

In various embodiments, laser level 110 emits a dot of light that projects perpendicularly from the upper surface of the housing 112 (e.g., vertically from the perspective of FIG. 8, horizontally from the perspective of FIG. 9), as well as emitting one or more planes of light.

Figure 10:
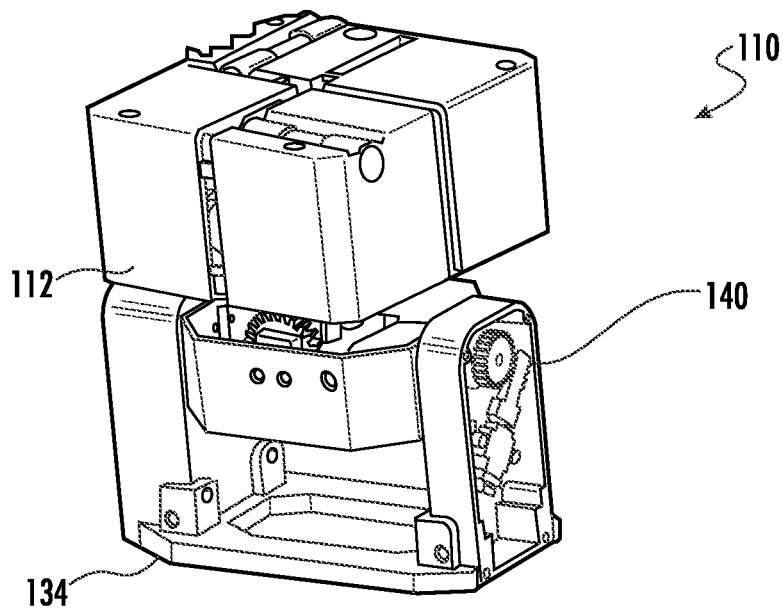
FIG. 10 is a perspective view of a cross-section of the laser level of FIG. 8, according to an exemplary embodiment.
Figure 11:
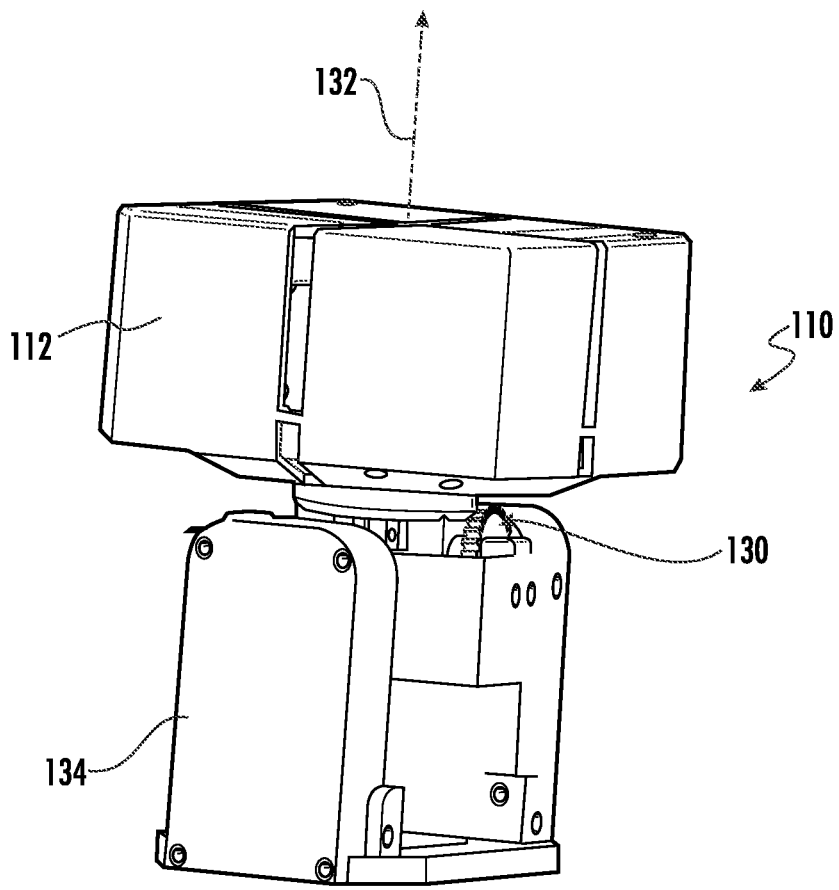
FIG. 11 is a perspective view of the laser level of FIG. 8, according to an exemplary embodiment.

Laser level 110 rotates housing 112 in direction 136 with respect to base 134. In the configuration shown in FIG. 9, laser emitter 114 emits a laser vertically and laser emitter 118 emits a laser horizontally. Rotational adjusting device 140 rotates housing 112 with respect to base 134 (FIG. 10). In a specific embodiment, third orientation adjusting device 130 rotates housing 112 around axis 132 with respect to base 134 (FIG. 11), thereby rotating lasers emitted by laser emitters 114, 118.

In a specific embodiment, housing 112 can rotate with respect to base 134 at preset angles (e.g., 45 degrees). In a specific embodiment, the X and Z axes leveling mechanisms include a worm gear, and the Y axis leveling mechanism includes spur gears. In a specific embodiment, each of the X, Y and Z leveling mechanisms are driven by a motor, such as a DC motor.

Figure 12:
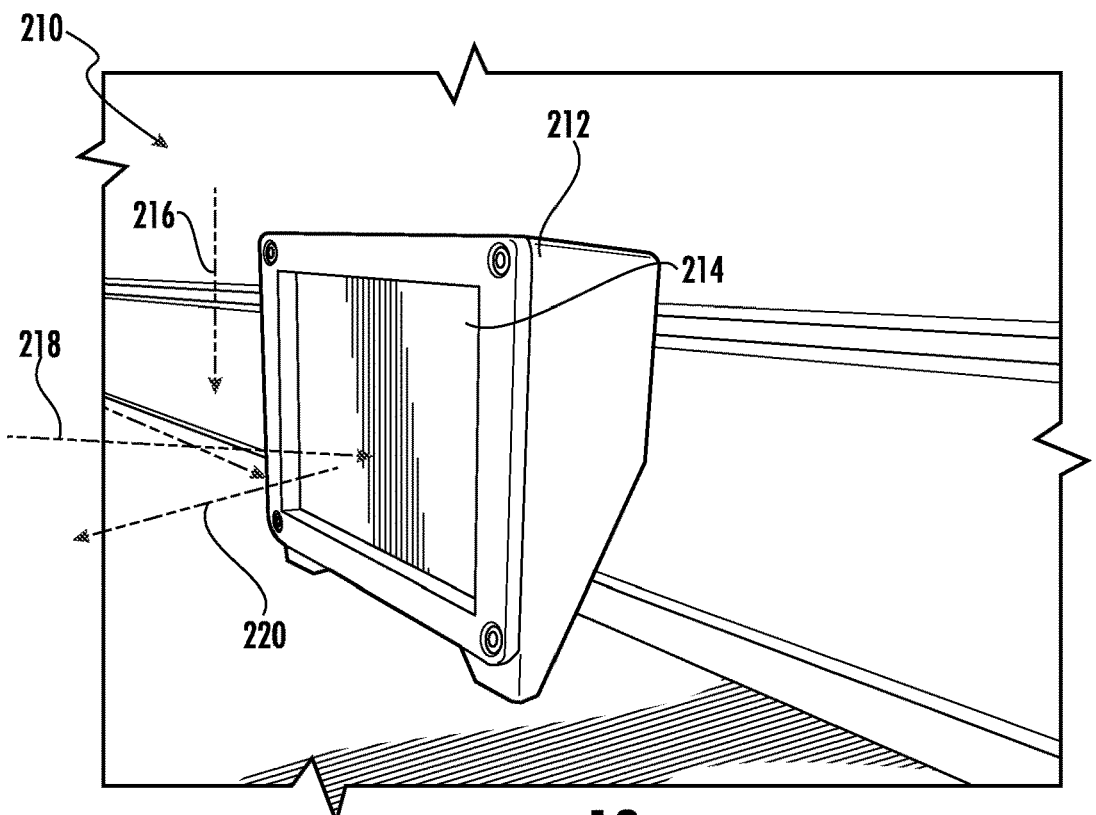
FIG. 12 is a perspective view of a laser light reflecting device, according to an exemplary embodiment.
Figure 13:
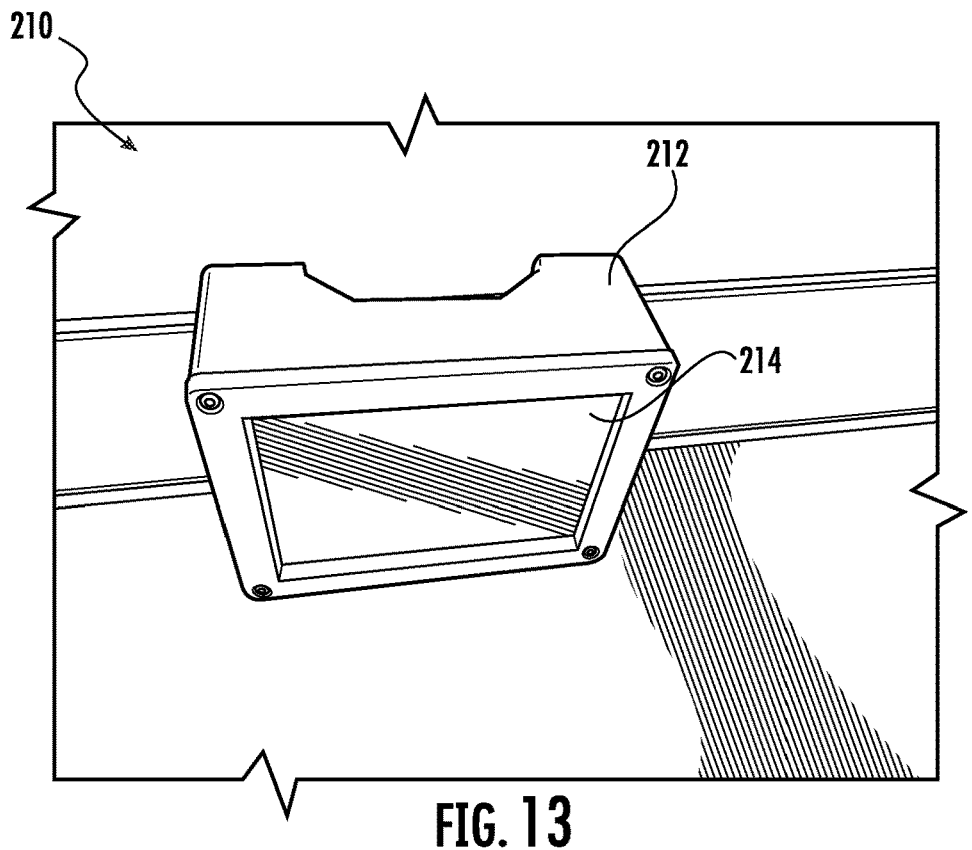
FIG. 13 is a perspective view of the laser light reflecting device of FIG. 12, according to an exemplary embodiment.
Figure 14:
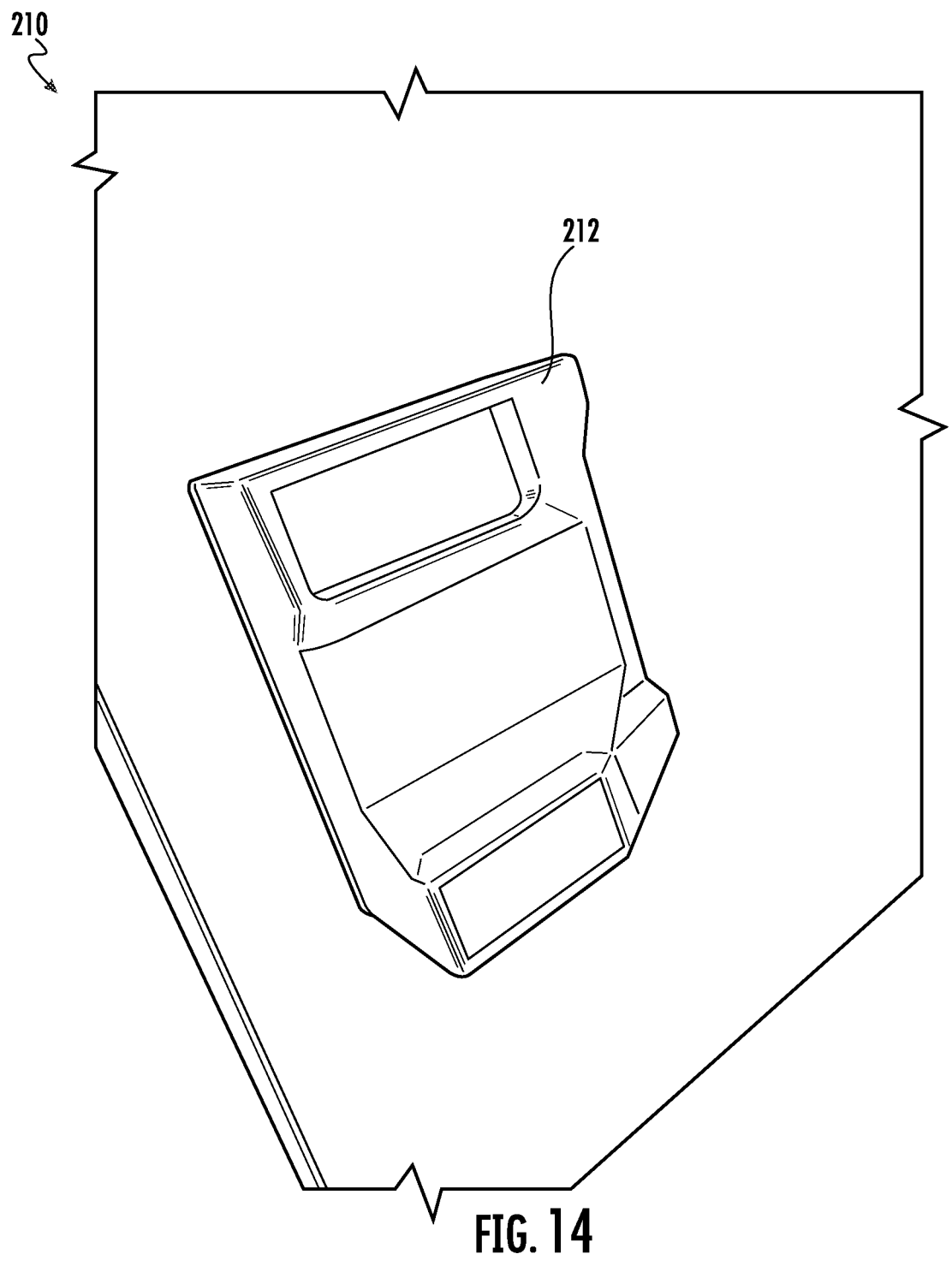
FIG. 14 is a perspective view of reflecting laser light reflecting device of FIG. 12, according to an exemplary embodiment.

Referring to FIGS. 12-14, a device to reflect received light, shown as laser light reflecting device 210, is shown. Laser light reflecting device 210 includes a housing 212 and a reflecting device, shown as mirror 214. In use, laser light reflecting device 210 is placed against a flat surface, such as a wall. Subsequently, in various embodiments mirror 214 is tilted (e.g., by two degrees) in direction 216 towards the ground to reflect the incident beam 218 to the floor for visual reference. The reflected beam 220 is projected on the floor and can be compared to the incident beam 218 that is projected on the floor to determine how far the laser emitter is from being perpendicular to the surface the laser light reflecting device 210 is placed against.

In various embodiments, laser light reflecting device 210 is configured to facilitate aligning an emitted laser to a perpendicular orientation with respect to a surface, such as a wall that laser light reflecting device 210 is placed against.

Figure 15:
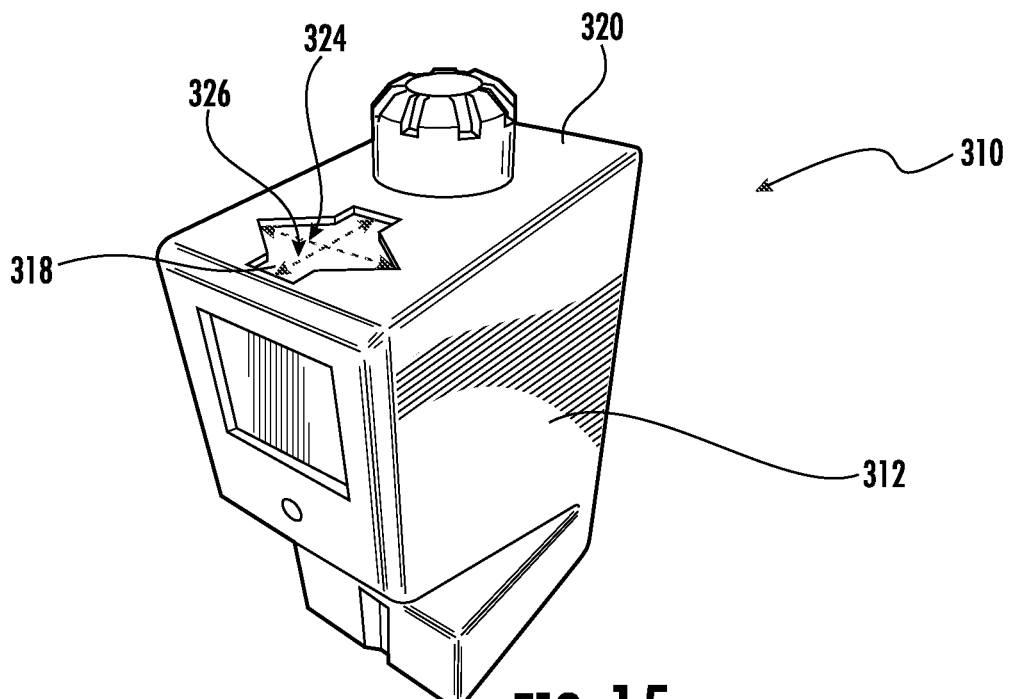
FIG. 15 is a perspective view of a laser light device, according to an exemplary embodiment.
Figure 16:
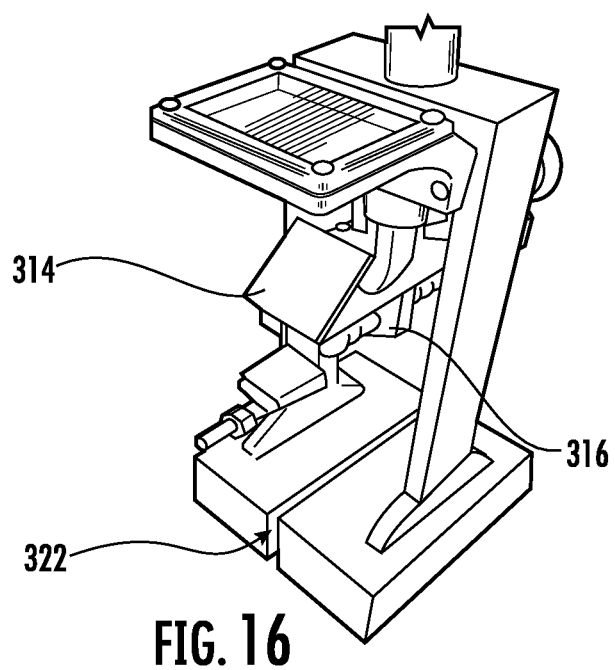
FIG. 16 is a perspective view of the laser light device of FIG. 15, according to an exemplary embodiment.

Referring to FIGS. 15-16, a laser target 310 is shown. Laser target includes housing 312, and a reflective surface, shown as mirror 314, internal to housing 312. Mirror 314 is coupled to a leveling device, shown as pendulum 316, that orients mirror 314 to a desired orientation (e.g., at a 45 degree angle with respect to a horizontal plane). A laser, such as a horizontal laser, is received at a front of laser target 310 and aligned with a mark, shown as notch 322. Mirror 314 reflects the laser upwards through aperture 318 of upper wall 320. In a specific embodiment, the mirror 314 and pendulum 316 are on a height-adjustable platform, allowing a user to align a horizontal laser with mirror 314 such that the reflected laser passes through the longest portion of aperture 318 along length 326, which is perpendicular to width 324.

In various embodiments, laser target 310 is configured to facilitate the transfer of light from the floor to the ceiling. In particular, laser target 310 is configured to reflect light that is directed at the floor and redirecting that light toward the ceiling, thereby projecting a line of light on the ceiling that corresponds to and is aligned with the line of light on the floor. Further, as the user aligns the light on the ground with notch 322, the light is reflected through the longest portion of aperture 318, shown as length 326, thereby increasing the length of the line reflected up to the ceiling.

Figure 17:
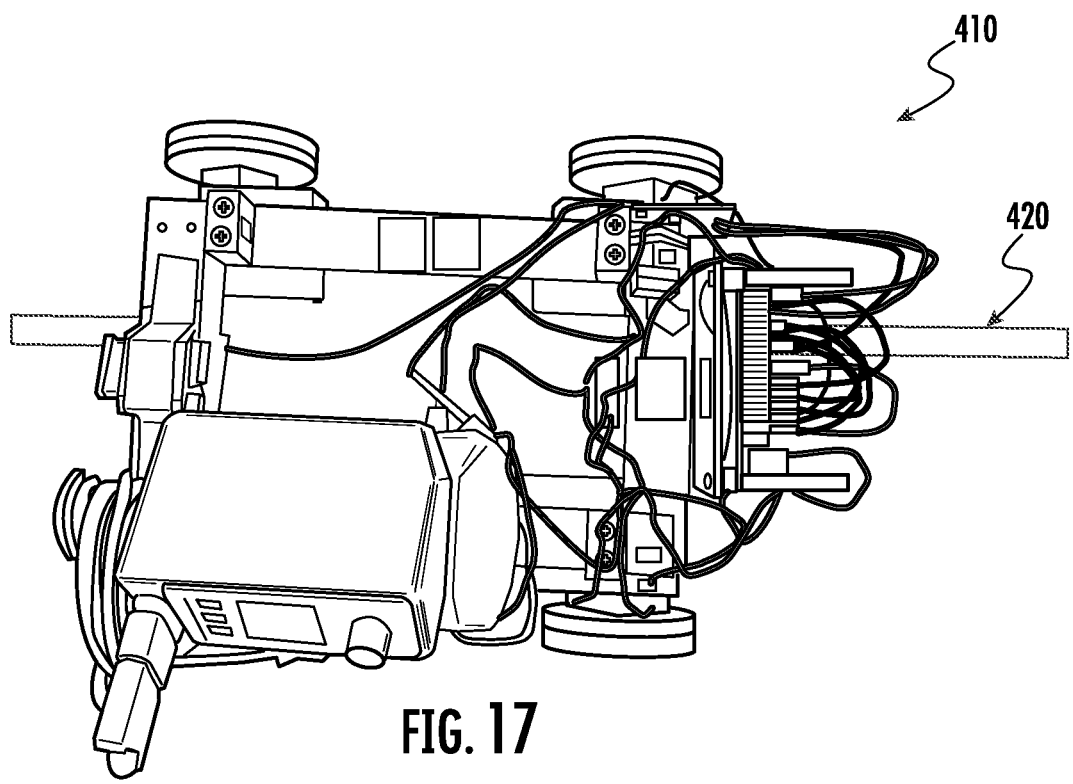
FIG. 17 is a top view of a laser beam generating device, according to an exemplary embodiment.

Referring to FIG. 17, a laser emitter and/or laser beam generating device, shown as laser level 410, is shown. Laser level 410 is substantially the same as laser level 10 and laser level 110 except for the differences discussed herein.

In a specific embodiment, laser level 410 is self-movable around a room, such as via wheels that can be rotated via an internal motor to move laser level 410. Laser level 410 can be used to mark locations on a surface, such as a ceiling surface, at periodic locations, such as evenly spaced locations.

Laser level 410 includes one or more sensors, such as photodiodes, that look for a line, such as a laser line or a tape line, shown as path 420, for laser level 410 to follow. Laser level 410 includes a laser distance measuring device that measures a location of laser level 410 with respect to an originating point. Laser level 410 is configured to receive one or more distances over which to project a light vertically along path 420. For example, laser level 410 receives a selected distance (e.g., two feet) for laser level 410 to move from an original location. Once laser level 410 determines it has moved the selected distance then laser level 410 emits a laser vertically.

In various embodiments, laser level 410 is configured to follow a suggested path, such as path 420, via operating one or more sensors, such as optical sensors, to detect path 420. In various embodiments, laser level 410 includes wheels and/or treads to facilitate laser level 410 moving across uneven ground and/or ground with debris.

Figure 18:
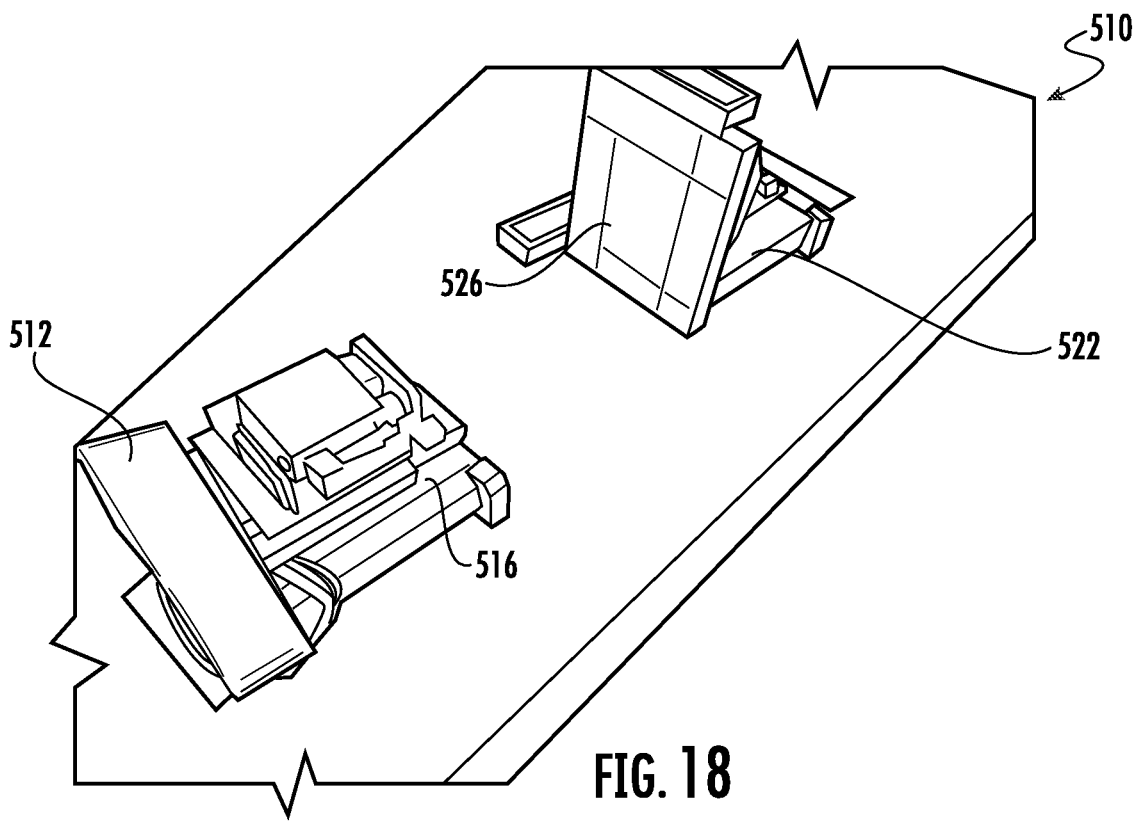
FIG. 18 is a perspective view of a laser light system, according to an exemplary embodiment.
Figure 19:
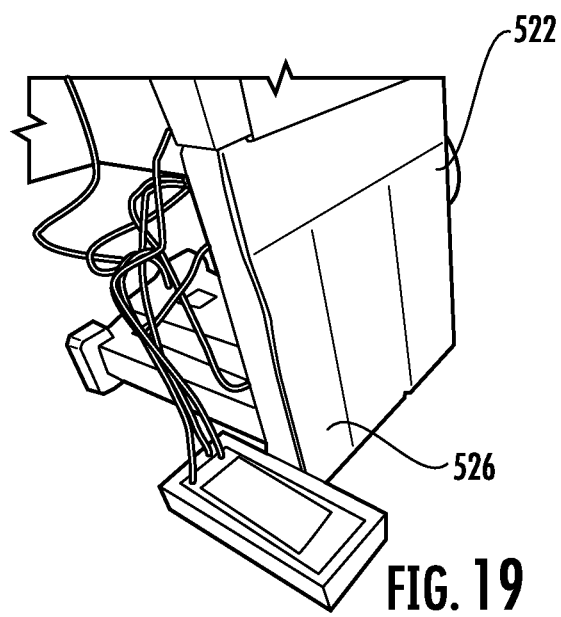
FIG. 19 is a perspective view of the target of the laser light system of FIG. 18, according to an exemplary embodiment.
Figure 20:
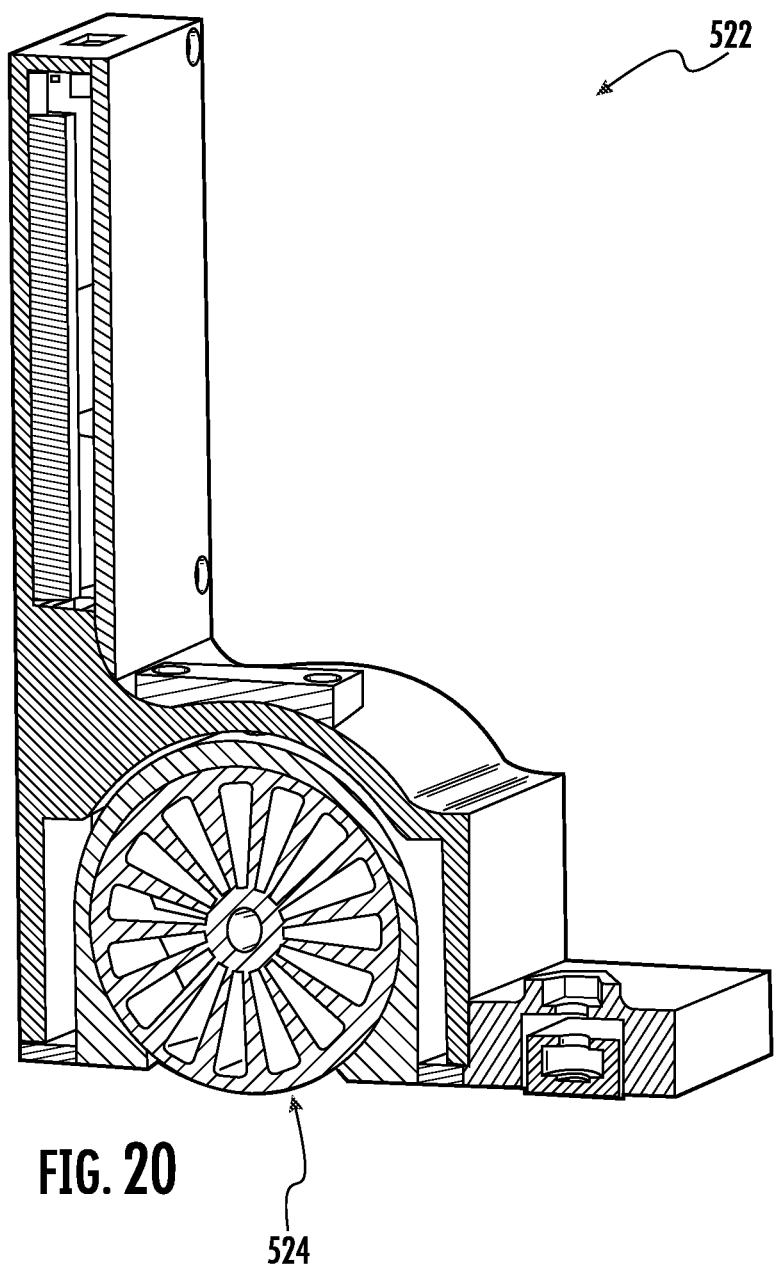
FIG. 20 is a perspective view of a cross-section of the target of the laser light generating system of FIG. 18, according to an exemplary embodiment.
Figure 21:
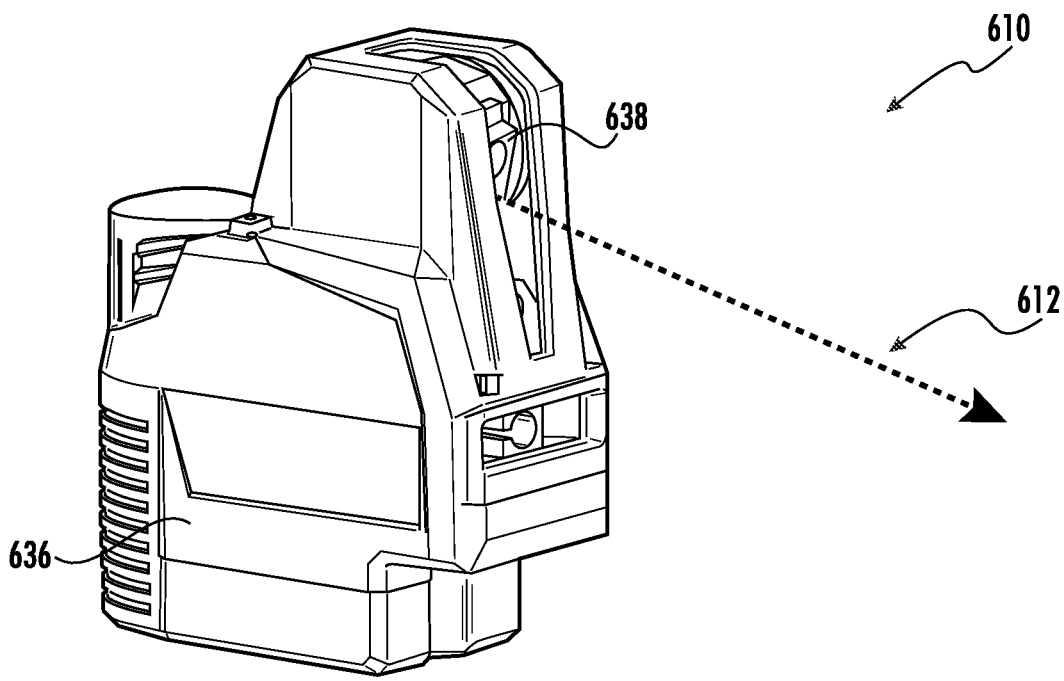
FIG. 21 is a perspective view of a laser light generating device, according to an exemplary embodiment.
Figure 22:
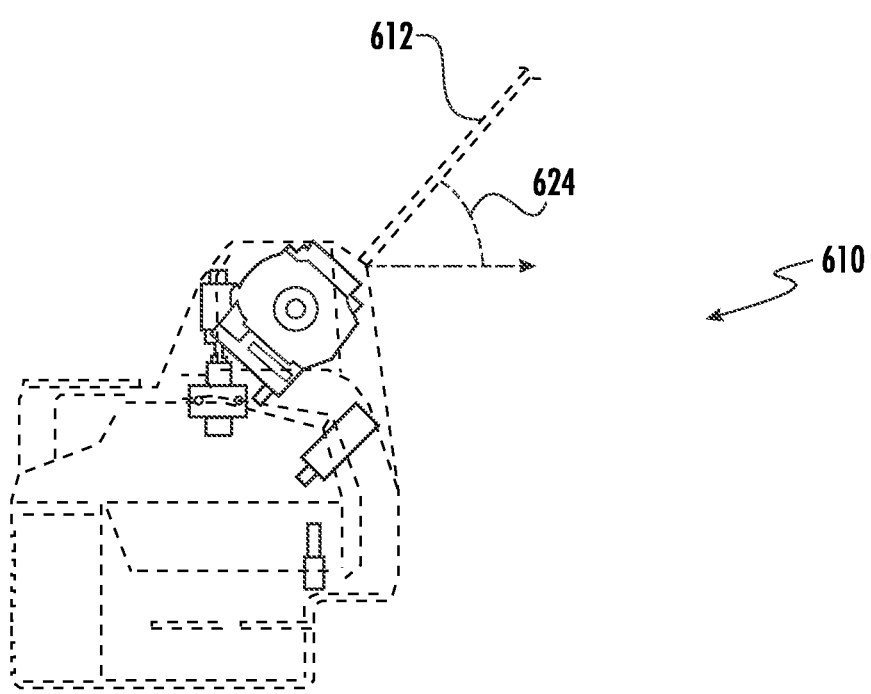
FIG. 22 is a ghost side view of the laser light generating device of FIG. 21, according to an exemplary embodiment.
Figure 23:
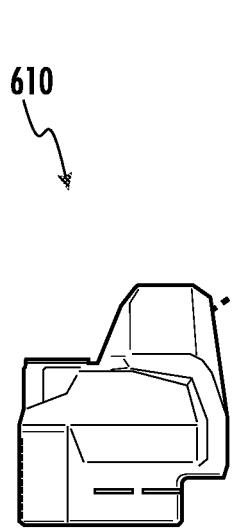
FIG. 23 is a side view of the laser light generating device of FIG. 21, according to an exemplary embodiment.
Figure 24:
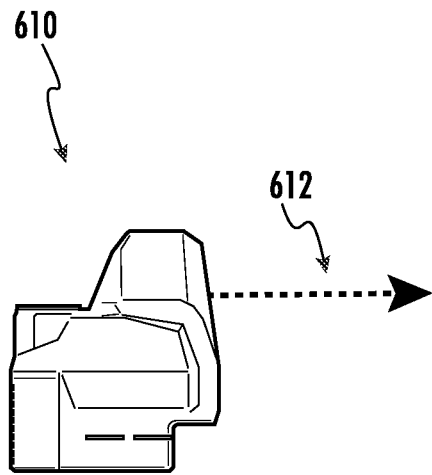
FIG. 24 is a side view of the laser light generating device of FIG. 21, according to an exemplary embodiment.
Figure 25:
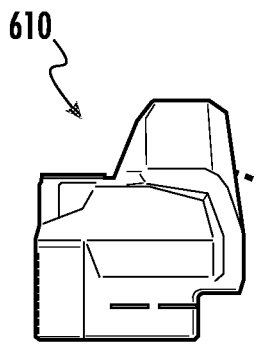
FIG. 25 is a side view of the laser light generating device of FIG. 21, according to an exemplary embodiment.
Figure 26:
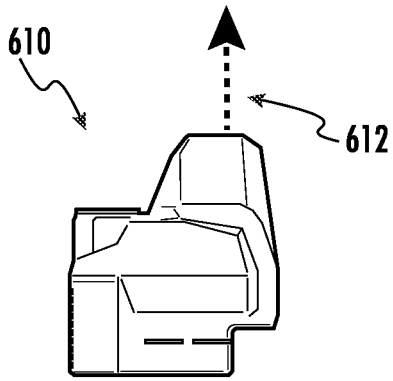
FIG. 26 is a side view of the laser light generating device of FIG. 21, according to an exemplary embodiment.
Figure 27:
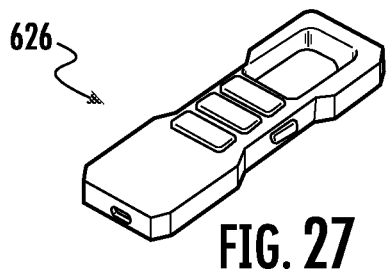
FIG. 27 is a perspective view of a remote control for the laser light generating device of FIG. 21, according to an exemplary embodiment.

Referring to FIGS. 18-20, a laser level system 510 is shown. Laser level system 510 includes laser level 512. Laser level 512 is substantially the same as laser level 10, laser level 110, and laser level 410 except for the differences discussed herein. Laser level 512 includes a distance measuring device 516 used to measure a distance of laser level 512 to target surface 526 of laser target 522.

Laser target 522 includes a device to receive a signal from laser level 512 indicating the measured distance. In use, laser target 522 is moved a first distance away from laser level 512 (e.g., 100 yards away). The distance between laser target 522 and laser level 512 is measured. Subsequently, laser target 522 is moved towards and away from laser level 512 via rotating wheel 524. The distance between laser target 522 and laser level 512 is then re-measured and compared against the previous measurement(s). Because the change in distance caused by rotating wheel 524 is known, the additional measurements can be combined with the initial measurements to calculate an estimate of the distance between laser target 522 and laser level 512 with improved accuracy.

In various embodiments, laser level system 510 includes one or more tracking modes, such as laser level system 510 tracking the distance between laser level 512 and laser target 522 as laser target 522 moves with respect to laser level 512.

In various embodiments, laser target 522 includes a roller in addition to or instead of wheel 524. In various embodiments, laser target 522 measures distances moved via an optical measuring device aimed at the ground that measures movement of laser target 522 with respect to the ground, similar to the functionality of some optical computer mouses.

Referring to FIGS. 21-30, a laser emitter and/or laser beam generating device, shown as laser level 610, is shown. Laser level 610 is substantially the same as laser level 10, laser level 110, laser level 410, and laser level 512 except for the differences discussed herein. Laser level 610 can be used to project one or more points along a surface, such as a ceiling, at specified distances from each other while laser level 610 remains stationary.

Laser level 610 includes housing 636 and laser emitter 638. Laser emitter 638 is rotatably coupled to housing 636 such that laser 612 emitted by laser emitter 638 can be rotated up and down. Laser 612 can be rotated angle 624 (FIG. 22) above the horizontal (e.g., which is perpendicular to gravity). Remote control 626 is configured to remotely control laser level 610.

The basic principle relies on the idea of triangulation. Given the distance to the ceiling, and the angle of projection, one can controllably articulate a laser distance measurer 630 and use a visible dot (or other methods described above) to project a destination for the user. By measuring the height to the ceiling, and articulating the laser distance measurer 630 at a known angle, a specific measurement can be projected.

In one exemplary use of laser level 610, a user turns on laser level 610. The user interface (of laser level 610 and/or remote 626) prompts the user to place a vertical dot emitted by laser level 610 to measure to the simulated ceiling height for the remainder of the run. Laser level 610 uses a laser distance measurer 630 (FIG. 29) to measure a distance to a surface, such as a ceiling.

The user interface prompts the user for relevant point spacing and length of run information which could be input via the user interface. Given the laser distance measurer 630 height measurement to the ceiling and the ability to measure angle 624 that laser 612 is emitted from laser level 610, laser level 610 can compute the relevant angles 624 and predicted distances along the linear run. Laser level 610 will articulate to the intended measurement point along the run. The user can select various points to be projected and even edit point spacing such that the laser live-updates point locations if unintended obstacles prevent anchor install at particular parts of a run.

In the event that the system detects that the dot does not hit the ceiling at the intended location, such as by measuring a confirmatory distance to a particular point. Errors may be caused by obstructions in the ceiling (e.g., other building systems), steps in ceiling height, half walls, corrugated ceilings, slanted ceiling, etc.

To prevent some of these obstructions, the laser could pre-scan the run to detect obstructions prior/during the projection to alert the user of future errors. At the end of the run, the system could notify the user that the run has been completed.

Figure 28:
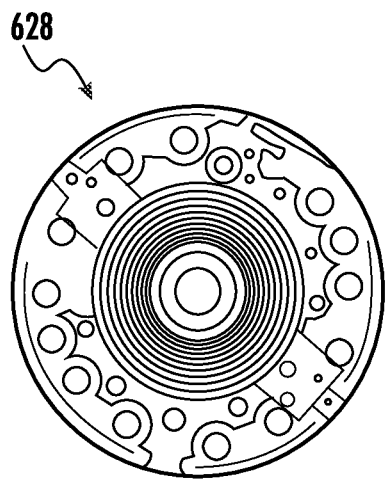
FIG. 28 is a perspective view of a slip ring of the laser light generating device of FIG. 21, according to an exemplary embodiment.
Figure 29:
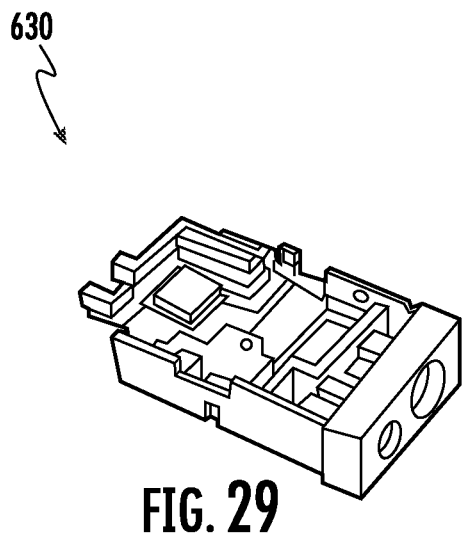
FIG. 29 is a perspective view of a laser distance measuring device of the laser light generating device of FIG. 21, according to an exemplary embodiment.
Figure 30:
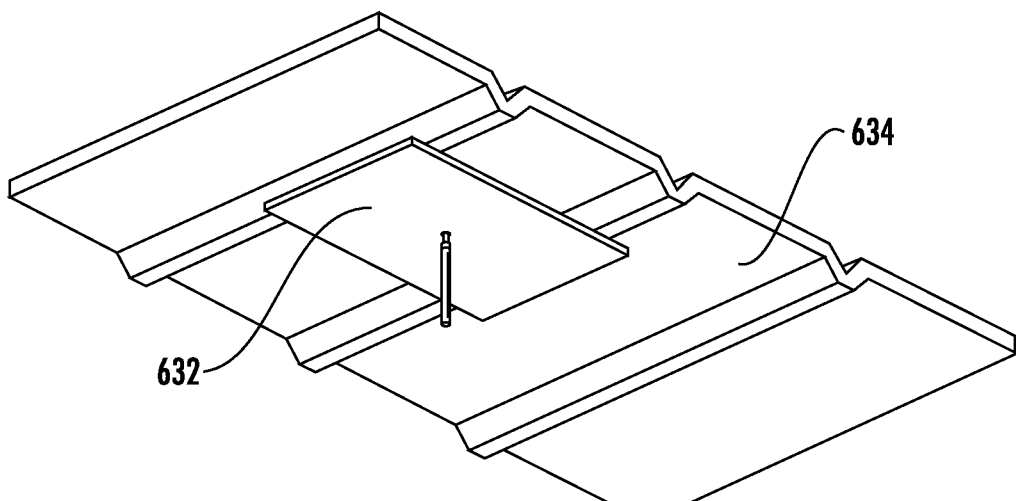
FIG. 30 is a perspective view of an exemplary environment in which the laser light generating device of FIG. 21 can be utilized, according to an exemplary embodiment.

In a specific embodiment, laser level 610 includes a contactless slip ring 628 (FIG. 28). In a specific embodiment, laser level 610 includes laser distance measurer 630 (FIG. 29). To solve issues with corrugated floors, a user could use a designated plate (FIG. 30) that spans the corrugations.

According to various embodiments, a laser level, such as laser level 10, includes a capacitive touch sensing device as a toggle switch to turn aspects of the laser level, such as planes of a laser, on and off. In a specific embodiment, a microchip senses a change in capacitance in a circuit induced by a person's hand coming close to or touching lightly the outside of one of the diode cages. When this change in capacitance is detected, the corresponding function (e.g., emitting a laser) is toggled on or off. In a specific embodiment, this functionality is enabled by running a wire from the metal diode cage to a microcontroller (MCU) which sense the change in capacitance. This wire provides a signal which triggers a signal in the MCU to turn on/off a diode or trigger other functions inside the laser. Applicant has observed sensing a user's hand before the hand touches a button can reduce the chances of a laser level being inadvertently bumping and its position adjusted.

For example, in various embodiments laser level 10 includes one or more input devices 34. In various embodiments, one or more of input devices 34 include an input button 36 configured to interface with a user, and a capacitance sensor. The capacitance sensor is configured to detect whether a hand of a user is within a distance, such as a first non-zero distance, of the button 36, and the input device is configured to generate a signal controlling the first laser light generator 14 in response to detecting the hand is within the first non-zero distance of the button.

In various embodiments, laser level 10 is a point, line and place laser level. In various embodiments, the input button is configured to toggle whether the first laser light generator 14 is generating the first line of light (e.g., toggling the light between being on and off). In various embodiments, the process of detecting whether the hand is within the first non-zero distance of the button includes the capacitance sensor detecting a change in capacitance.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A laser level comprising:
   a housing;
   a first laser light generator disposed within the housing and operable to generate a first line of light; and
   an input device comprising an input button and a capacitance sensor, the capacitance sensor is configured to detect whether a hand of a user is within a first non-zero distance of the input button, the input device configured to generate a signal controlling the first laser light generator in response to detecting the hand is within the first non-zero distance of the button.

2. The laser level of claim 1, wherein the laser level is a point, line and place laser level.

3. The laser level of claim 1, wherein the input button is configured to toggle whether the first laser light generator is generating the first line of light.

4. The laser level of claim 1, wherein the detecting the hand is within the first non-zero distance of the button comprises the capacitance sensor detecting a change in capacitance.

* * * * *